United States Patent
Weber et al.

(10) Patent No.: US 9,321,475 B2
(45) Date of Patent: Apr. 26, 2016

(54) RIDING BOARD APPARATUS

(71) Applicants: Esther Weber, Brooklyn, NY (US); Samuel Weber, Brooklyn, NY (US); Joel Hoag, New York, NY (US); Eric Ciampoli, Weehawken, NJ (US)

(72) Inventors: Esther Weber, Brooklyn, NY (US); Samuel Weber, Brooklyn, NY (US); Joel Hoag, New York, NY (US); Eric Ciampoli, Weehawken, NJ (US)

(73) Assignee: Esther Weber and Samuel Weber, Brooklyn, NY (US)

( * ) Notice: Subject to any disclaimer, the term of this patent is extended or adjusted under 35 U.S.C. 154(b) by 0 days.

(21) Appl. No.: 14/666,716

(22) Filed: Mar. 24, 2015

(65) Prior Publication Data
US 2015/0266494 A1  Sep. 24, 2015

Related U.S. Application Data

(60) Provisional application No. 61/969,534, filed on Mar. 24, 2014.

(51) Int. Cl.
  *B62B 9/28* (2006.01)
  *B62B 5/08* (2006.01)

(52) U.S. Cl.
  CPC .. *B62B 9/28* (2013.01); *B62B 5/087* (2013.01)

(58) Field of Classification Search
  None
  See application file for complete search history.

(56) References Cited

U.S. PATENT DOCUMENTS

| | | | |
|---|---|---|---|
| 5,813,679 A | 9/1998 | Hobrath | |
| 5,882,022 A * | 3/1999 | Convertini et al. | 280/47.38 |
| D426,177 S * | 6/2000 | Lundh | D12/133 |
| D428,367 S * | 7/2000 | Lundh | D12/133 |
| 6,422,634 B2 * | 7/2002 | Lundh | 296/97.21 |
| 6,447,001 B1 * | 9/2002 | Hsia | 280/642 |
| 6,540,238 B2 * | 4/2003 | Yang | 280/32.7 |
| 6,698,772 B1 * | 3/2004 | Cervantes | 280/47.35 |
| 6,827,356 B2 * | 12/2004 | Zhuang | 280/32.7 |
| 6,851,693 B2 | 2/2005 | Haeggberg | |
| 7,300,061 B1 | 11/2007 | Omstead | |
| 7,581,737 B2 * | 9/2009 | Cousin | 280/63 |
| 7,591,506 B2 * | 9/2009 | Flannery | 297/174 CS |
| 7,832,746 B2 | 11/2010 | Peterson | |
| 7,971,884 B2 * | 7/2011 | Lundh | 280/32.7 |
| 8,029,007 B2 * | 10/2011 | Jones et al. | 280/47.131 |
| 8,146,936 B2 * | 4/2012 | Lai | 280/204 |
| 8,276,922 B2 * | 10/2012 | Lai | 280/32.7 |
| 8,500,139 B1 * | 8/2013 | Andrews et al. | 280/32.7 |
| 2001/0033069 A1 * | 10/2001 | Ivers | 280/648 |

(Continued)

FOREIGN PATENT DOCUMENTS

| | | |
|---|---|---|
| DE | 103 18 434 A1 | 8/2004 |
| DE | 10 2010 016 921 A1 | 11/2011 |
| WO | 2014/037177 A1 | 3/2014 |

OTHER PUBLICATIONS

International Search Report and Written Opinion dated Jun. 26, 2015 from related International Application No. PCT/US2015/022176.

(Continued)

*Primary Examiner* — S. Joseph Morano
*Assistant Examiner* — Hilary L Johns
(74) *Attorney, Agent, or Firm* — DLA Piper LLP (US)

(57) ABSTRACT

A riding board apparatus configured to be mounted to a stroller is provided. The riding board apparatus includes a platform, at least one mounting arm extending from the platform, and a seat mounted onto the platform and is configured to be convertible between a sitting configuration and a stowable configuration.

18 Claims, 17 Drawing Sheets

(56) References Cited

U.S. PATENT DOCUMENTS

| | | | | |
|---|---|---|---|---|
| 2003/0025304 | A1* | 2/2003 | Haeggberg | 280/656 |
| 2006/0290081 | A1* | 12/2006 | Baum | 280/32.7 |
| 2010/0109270 | A1* | 5/2010 | Hei et al. | 280/47.35 |
| 2011/0175406 | A1* | 7/2011 | Zeng | 297/183.1 |
| 2013/0062846 | A1 | 3/2013 | Hsiao | |

OTHER PUBLICATIONS

Englacha—2 in 1 (Jan. 13, 2014).
Kidsit (Jan. 13, 2014).
Litaf—Sit n go (Jan. 13, 2014).
Orbell—Pick up (Jan. 13, 2014).
Perle—Buggypod (Jan. 13, 2014).
Twoo 1 (Jan. 13, 2014).
Bugaboo-comfort-wheeled-board (Jan. 2015).
Lascal (Feb. 2015).
BuggyPod-Smorph (03/17/15).
Baby Jogger—Glider 1 (Jan. 13, 2014).
Britax (Jan. 13, 2014).
Lascal (Jan. 13, 2014).
Litaf—Ez step (Jan. 13, 2014).
Mountaibuggy—Freerider (Jan. 13, 2014).
Mutsy—Set up (Jan. 14, 2014).
Orbet Baby (Jan. 13, 2014).
Quinny—Jet (Jan. 13, 2014).
Silver Cross—Surf (Jan. 13, 2014).
Uppababy—Piggyback (Jan. 13, 2014).
Valco hitchhiker (Jan. 13, 2014).
Bumprider Buggy Board (Apr. 14, 2015).
Bibi Stroli Rider (Apr. 14, 2015).

\* cited by examiner

RIDING BOARD APPARATUS

RELATED APPLICATION

This application claims priority to a provisional application U.S. 61/969,534, filed on Mar. 24, 2014.

BACKGROUND

Currently, there exists demand for riding boards that, in combination with a stroller, may allow a child to ride behind the stroller while standing. However, the existing riding boards have a variety of limitations. Many of the existing riding boards lack an attachable seat that allows a child to sit on the riding board. Additionally, the riding boards that do feature a child seat compromise other useful functions of the riding board. For example, the positioning of the seat extending into the vertical space above the riding board impedes the ability to easily lift the riding board and hold the riding board towards the back side of the stroller for storage. Without the ability to lift the riding board upwards towards the stroller, the user must maneuver the stroller with the riding board and chair extending from the rear. As a result, maneuvering the stroller with attached riding board and upright chair can be cumbersome, especially when transporting the stroller up or down steps or stairs. Furthermore, some existing riding boards have seats that substantially reduce available standing space for a child such that these seats must be completely removed to allow a child to be transported in a standing position. When such seats are removed they have to be carried separately if the seating position will be desired, further inconveniencing the users.

Consequently, what is needed is a riding board apparatus with a foldable seat that will allow the stroller with an attached riding board: to have a board that can be easily lifted for storage towards backside of the stroller; to be easily transported up/down stairs; to have a seat that does not compromise the ability of the child to stand on the board if desired; and to be configured to allow for transportation of a child, both, in a standing and seating option, without having to attach/detach a seat from the board. Such riding board may also be configured to have a variety of advantageous features.

SUMMARY

I provide a riding board apparatus configured to be mounted to a stroller. The riding board apparatus includes a platform, at least one mounting arm extending from the platform, and a seat mounted onto the platform and configured to be convertible between a sitting configuration and a stowable configuration. The riding board is convertible between a sitting configuration and a stowable configuration by pivoting the chair support relative to the wheeled platform, and rotating the seat relative to the chair support.

DRAWINGS

DETAILED DESCRIPTION

Figure 1:
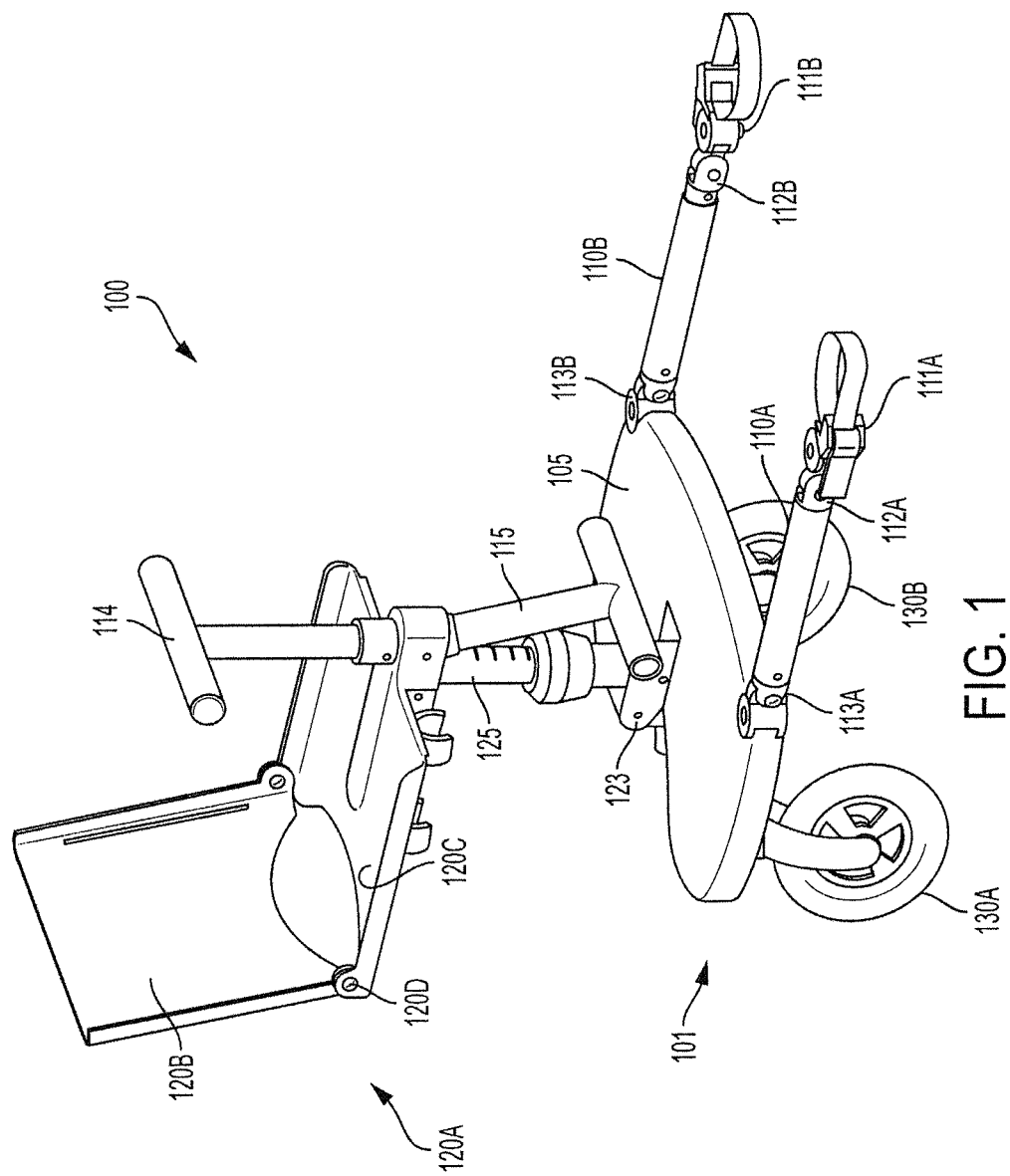
FIG. 1 shows an exemplary riding board with a seat in a sitting configuration facing a forward direction.

This disclosure relates to a riding board apparatus that is configured to be mountable to a stroller and comprises an attached seat that is both supportive and stowable. The riding board is convertible between a sitting configuration and a stowable configuration. The ability to move the riding board apparatus between the sitting and stowable configurations provides as-needed access to a seat and allows for the seat or, optionally, the entire riding board apparatus to be conveniently stowed out of the way without having to detach the seat from the riding board apparatus.

As used herein, the term "sitting configuration" refers to a configuration wherein a seat is extended generally upright to provide at least a horizontal surface that can support a seated child. When the riding board is in a sitting configuration a child can ride along with the stroller in a seated position. It should be understood that use of the term "sitting configuration" does not exclude the possibility that a child may also stand on the riding board while the seat is upright, such as by standing next to the seat.

As used herein, the term "stowable configuration" refers to a configuration wherein the riding board is configured to provide clearance to a vertical space above a standing platform and, thus, access to a horizontal surface of the standing platform. When the riding board is in the stowable configuration, a child can ride along with the stroller by standing on the standing platform. The positioning of the riding board in the stowable configuration is not limited and may include without limitation a configuration wherein the seat is folded and stored underneath a standing platform, a configuration wherein the seat is folded and stored on a side of a standing platform, or a configuration wherein the seat is folded and positioned to provide a horizontal surface of a standing platform. In any configuration, it is preferable that the seat is configured to avoid contact with the ground so as not to interfere with the movement of the riding board apparatus behind the stroller.

Additionally, when the riding board is in the stowable configuration, the riding board may preferably be configured to be moveable to a further "lifted configuration." In the lifted configuration, the riding board is lifted upwardly off of the ground and towards the rear of the stroller. Preferably, the riding board can be secured to the stroller in the lifted configuration for "on-the-go" storage of the riding board apparatus on the stroller body.

When the riding board is in the lifted configuration, the stroller and attached riding board can be moved up or down one or more steps without the riding board substantially encumbering or interfering with maneuverability. In order to use a stroller on a staircase the stroller generally needs to be tilted at an angle and pulled up or pushed down the stairs. Full clearance may be needed to keep the stroller at an angle. With the seat in the stowed position tucked under or positioned horizontally above the board, the riding board apparatus may be lifted against the back of the stroller creating enough clearance to push/pull the stroller on a staircase. This is possible because a seat in the stowable position (as shown by example in FIG. 4), rather than extending upwards in the sitting position (as shown by example in FIG. 1), does not block the board from being lifted upwards towards the stroller. This feature provides users with flexibility to use the stroller with an attached riding board apparatus even when they will have to pull the stroller up or down a flight of stairs or just a single step or a curb.

The entire folding mechanism of the riding board apparatus is advantageous because it may be adopted according to the need of the user. The stroller and riding board apparatus can easily be wheeled even when the seat is in the stowable configuration. In particular, the seat will not interfere with the stroller when in motion because the seat is compactly folded flat against the board. In one embodiment, the folded seat is raised high off the ground and does not make any contact with the ground.

The seat may be easily unfolded (see FIG. 1) when a child is transported in a seating position. Alternatively, when a child is transported in a standing position the seat may be stowed away to give space for the child's feet (see FIG. 4). Thus, the invention is particularly useful for children who sometimes want to stand on the board, and sometimes want to sit down on the seat when they get tired. The seat can be easily folded and unfolded eliminating the need to detach the seat when the child wants to stand.

Additionally, it should be understood that reference to use of the riding board of this disclosure with a "stroller" is non-limiting. The riding boards can be used with any wheeled device, including but not limited to strollers, wheelchairs, wheeled-carts and the like. As used herein, reference to use of the riding board with a "stroller" is inclusive of use with any such wheeled device.

While certain embodiments of the invention are described below, it will be understood that the embodiments described are by a way of example only. Accordingly, the present disclosure should not be limited based on the described embodiments. Exemplary embodiments of a riding board that may be configured for transporting a child in both sitting and standing position are shown in the figures. However, the figures are in no way limiting, and it is to be understood that the present invention may be practiced in a variety of ways. In the drawings, like numerals indicate like elements throughout the disclosure.

FIG. 1 depicts an exemplary riding board apparatus 100 in a sitting configuration. The riding board apparatus 100 comprises a wheeled platform 101 having a board 105 and at least one wheel 130A, 130B. In the example shown in FIG. 1, the board 105 is configured to provide a horizontal surface of a standing platform on which a child can stand.

As shown in FIG. 1, the riding board apparatus 100 further comprises at least one or, preferably, two moveable mounting arms 110A, 110B attached to wheeled platform 101. The moveable mounting arms 110A, 110B extend anteriorly away from the wheeled platform 101. The moveable mounting arms 110A, 110B are configured to be engagable with a structure on the rear end of a stroller (not shown) and to mount the riding board apparatus 100 to the stroller. Preferably, the moveable mounting arms 110A, 110B may be manufactured or adjusted to have a length, angle, axial rotation, position, orientation and/or configuration to accommodate the structural variations of many different makes and models of stroller.

A distal end of each mounting arm 110A, 110B is preferably fitted with a mounting device 111A, 111B for mounting the riding board apparatus 100 to a stroller. The mounting devices 111A and 111B may be removeably attachable to any structure of the stroller, such as but not limited to a vertical support of the stroller, a horizontal bar of the stroller, or a support structure at any oblique angle. The type of mounting device 111A, 111B is not particularly limited. Suitable mounting devices 111A, 111B include but are not limited to an adjustable clamp or ratchetable device with an adjustable strap. Other devices suitable for attaching the riding board apparatus 100 to the stroller are known in the art and may be used without limitation.

Additionally, as shown in FIG. 1, the moveable mounting arms 110A, 110B may include one or more pivoting joints configured to allow the moveable mounting arms 110A, 110B to bend or pivot. As shown in FIG. 1, the moveable mounting arms 110A, 110B are provided with anterior pivoting joints 112A, 112B and posterior pivoting joints 113A, 113B. The anterior pivoting joints 112A, 112B are shown at a junction with the mounting devices 111A, 111B and the posterior pivoting joints 113A, 113B are shown at a junction with the wheeled platform 101. However, the moveable mounting arms may include one or more pivoting joints at positions different than those shown in FIG. 1.

Preferably, the pivoting joints of the moveable mounting arms 110A, 110B may be selectively lockable to restrict pivoting motion when it is desired to maintain the moveable mounting arms 110A, 110B in a set configuration. Additionally, the pivoting joints of the moveable mounting arms 110A, 110B may be selectively unlockable to allow the moveable mounting arms 110A, 110B to bend or pivot at the position of the pivoting joints when it is desired to change the configuration of the mounting arms 110A, 110B.

Still referring to FIG. 1, the riding board apparatus 100 is shown further comprising a seat 120A. The configuration of the seat 120A is not limited, but may include a seat rest 120C and, optionally, a backrest 120B. The seat 120A may optionally be a fully protective bucket-style seat, a saddle-type seat or any other suitable configuration.

Figure 2:
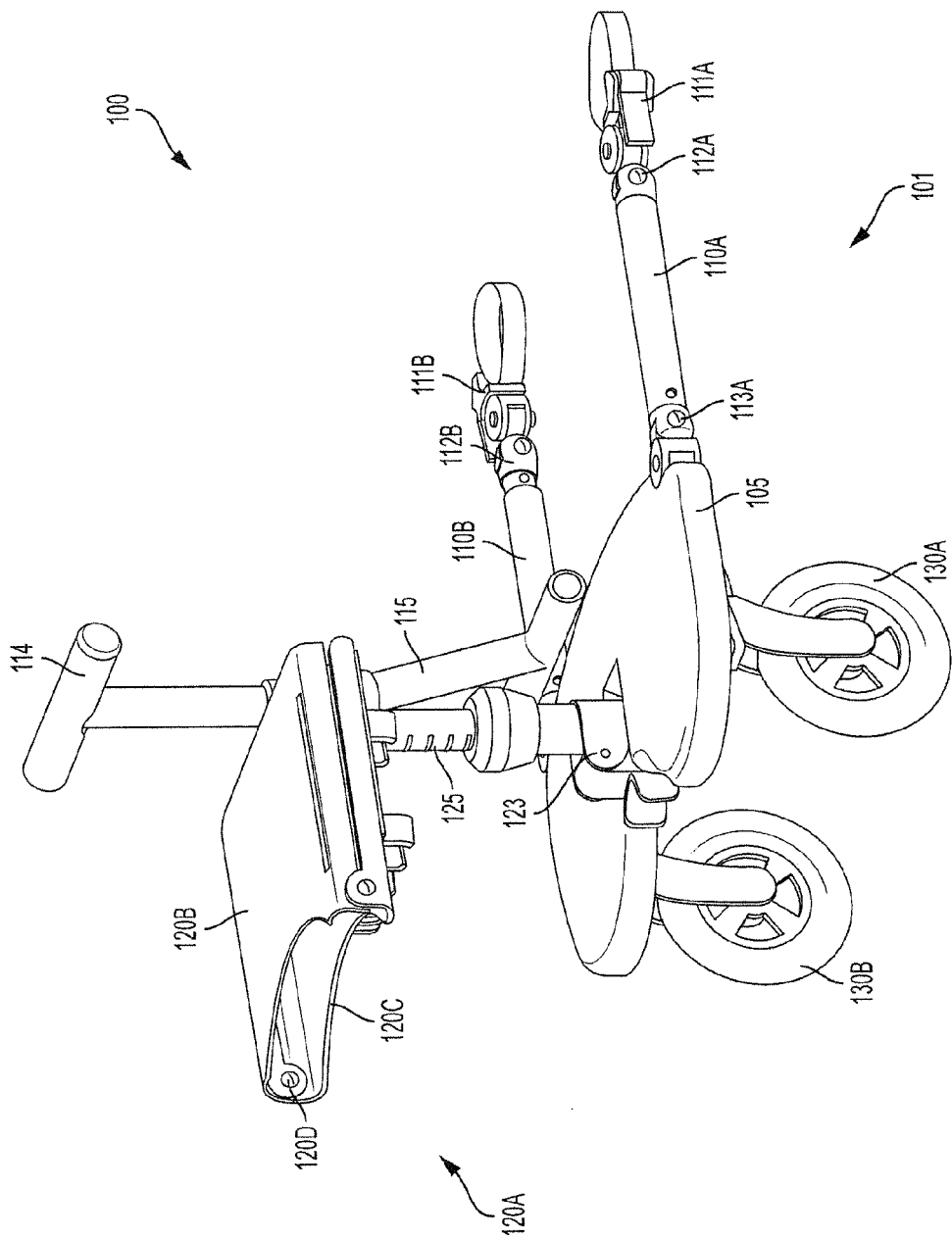
FIG. 2 shows the riding board of FIG. 1 with a back rest in a folded position.

If included, the backrest 120B may be configured in such a way that the backrest 120B is foldable downwards towards the seat rest 120C. For example, the back rest 120B may be mounted to the rear of the seat rest 120C by hinges 120D. Hinge 120D may be a pivoting hinge, sliding hinge or the like. A seat 120A with the back rest 120B in a folded position is shown in FIG. 2.

The seat 120A may be connected to the board 105 of the riding board apparatus 100 via a moveable chair support 125 that supports the seat 120A in a generally upright, extended position. As shown in FIG. 1, an exemplary chair support 125 comprises an inverted L-shaped post extending upwardly. However, other configurations are possible and an exemplary alternative is discussed below.

Optionally, the chair support 125 may be adjustable to allow the seat 120A to be positioned at a desired height. For example, the chair support may include adjustable telescoping tubes provided with a spring button locking pin, lever lock, rotating lock latch or the like. The height of the chair support 125 may be adjusted to accommodate the size of the child and/or to enable compact folding of the seat 120A when storing the seat in the stowable configuration. Additionally, if desired, the chair support 125 can be axially rotatable to enable the seat 120A to be moved between forward, side and/or rear facing directions. For example, the seat 120A may be configured to face the stroller (not shown), to face directly away from the stroller, or to face in any arbitrary directions.

Figure 3:
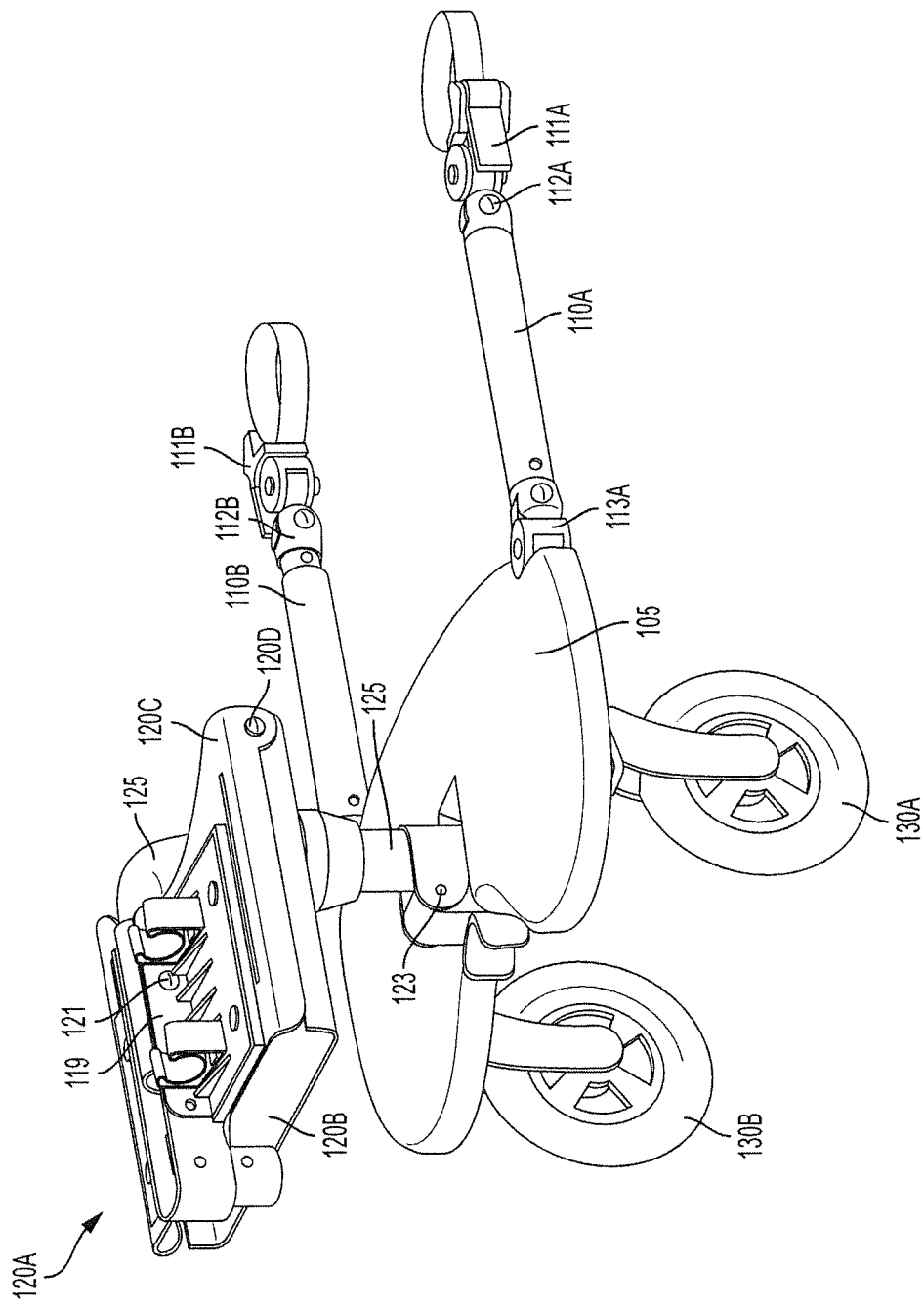
FIG. 3 shows the riding board of FIG. 1 with a seat in the process of being moved to a stowable configuration.

The seat 120A can be mounted to the chair support 125 by any suitable mechanism. In one embodiment, the seat 120A may be connected to a chair support 125 by a means that allows the seat 120A to be freely rotated relative to the chair support 125 when the seat 120A is being moved to the stowable configuration. As shown in FIG. 3, the seat 120A can be mounted to the arm of L-shaped chair support 125 by a support bracket 119 and a pin 121 around which the seat 120A is rotatable 180°. However, in other embodiments, other ways of configuring the seat 120A and/or the chair support 125 to be re-orientable may also be used. Preferably, the mechanism connecting the chair support 125 and seat 120A is configured to be releasably lockable to stabilize and support the seat 120A when in use by a child. Optionally, the angle of the seat 120A can be selected and set in a reclined or horizontal position.

The chair support 125 is further configured to allow the seat to be movable between the sitting and stowable configurations. For example, the chair support 125 may be pivotably mounted on the board 105 by a hinge 123 that allows the chair support 125 to pivot relative to the wheeled platform 101. As shown by comparison of FIGS. 1 and 4, the L-shaped chair support 125 may be moveable by pivoting up to 180° relative to the wheeled platform 101. The chair support can also translate forward or backward relative to the wheeled platform 101, such as by telescoping or sliding mounting mechanism.

Preferably, the hinge 123 is further configured to be releaseably lockable to stabilize and support the seat 120A, such as by means of a release mechanism (such as a ring), and/or a tension mechanism. However, other ways of securing the chair support 125 may be utilized. Optionally, the angle of the chair support 125 can be selected to position the seat 120A in a reclined or horizontal position.

Additionally, the chair support 125 and seat 120A may be permanently mounted on the board 105 or, alternatively, the entire chair support 125 and/or seat 120A may be configured to be completely detachable and removable from the board 105 for situations where only a standing board is needed. This may be useful, for example, in case when the riding board apparatus 100 is intended for an older child who may only want to stand on the riding board.

Figure 4:
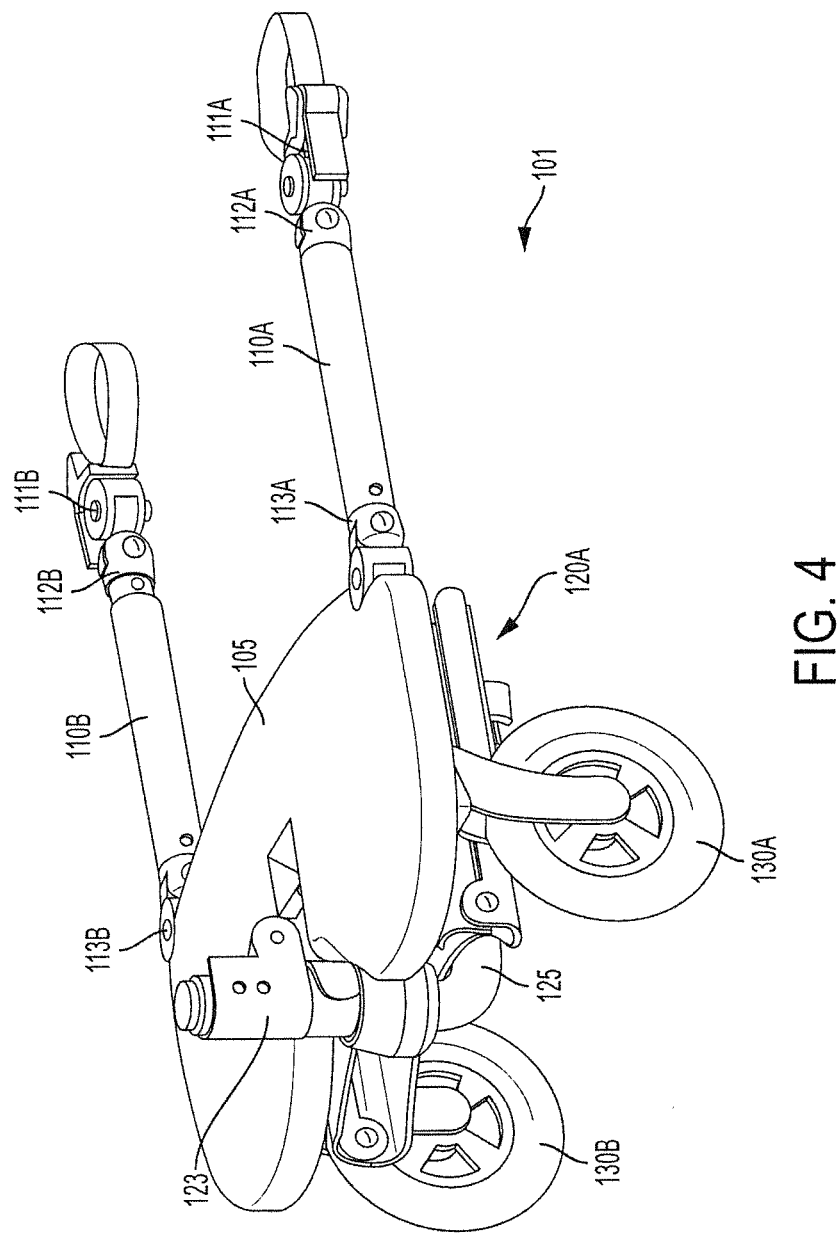
FIG. 4 shows the riding board of FIG. 1 in a stowable configuration.

Referring to FIGS. 2-5, the methods for converting the riding board apparatus 100 from the sitting configuration to the stowable configuration will now be described. If included, the backrest 120B may be folded downward towards the seat rest 120C as shown in FIG. 2. Additionally, if included, a removable handlebar 114 and/or a removable footrest 115 can be detached from the seat 120A and stowed. If necessary, the height of the chair support 125 may be adjusted to enable compact folding. As shown in FIG. 3, the seat 120A can be rotated 180° around the arm of inverted L-shaped chair support 125 by operation of the support bracket 119 and pin 121 and may be releaseably locked in position. As shown in FIG. 4, the hinge 123 may be released (e.g. by sliding up a ring) to enable the chair support 125 to rotate backwards up to 180 degrees towards the stowable configuration. As shown by example in FIG. 4, the folded seat 120A in the stowable configuration is tucked under the board 105 so that it rests between the wheels 130A, 130B that are attached to the board 105. Alternatively, the seat may by folded and stored on a side of a standing platform (as shown by example in FIG. 17) or may be folded and positioned to provide a horizontal surface of a standing platform (as shown by example in FIG. 18). The riding board apparatus 100 may be configured such that, in the stowable configuration, it can be moved towards the back of the stroller to the lifted configuration (best seen by example in FIG. 5) so that the board is raised up and out of the way, if desired.

Turning now to FIGS. 5 to 18, an alternative example of a riding board apparatus 200 is depicted in various positions. Like the riding board apparatus 100 of FIG. 1, riding board apparatus 200 comprises a wheeled platform 201 having a board 205, at least one wheel 230A,B, and at least one attached moveable mounting arm 210A,B with similar structure and operation. The riding board apparatus 200 includes an alternative structure for the chair support 225 and seat 220A.

Figure 5:
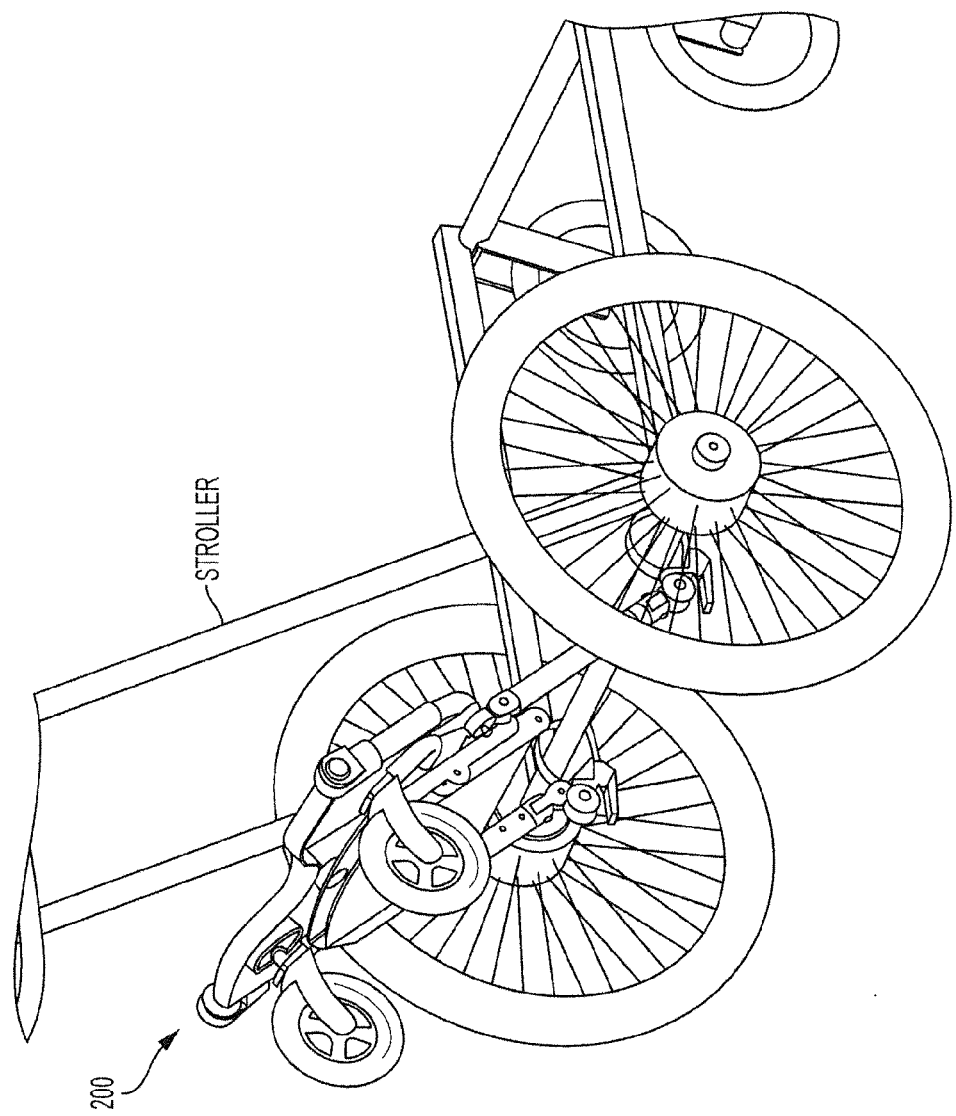
FIG. 5 shows an exemplary riding board in a lifted configuration.

As shown in FIG. 5, the riding board apparatus 200 may be configured such that, in the stowable configuration, it can be moved towards the back of the stroller to the lifted configuration so that the board is raised up and out of the way, if desired. The riding board apparatus 200 may be moved to the lifted configuration by pivoting the moveable mounting arms 210A, 210B at the pivoting joints 212A and 212B and optionally at pivoting joints 213A and 213B to allow the rear end of the wheeled platform 201 to be lifted upwards and, optionally, secured to the rear of a stroller.

Figure 6:
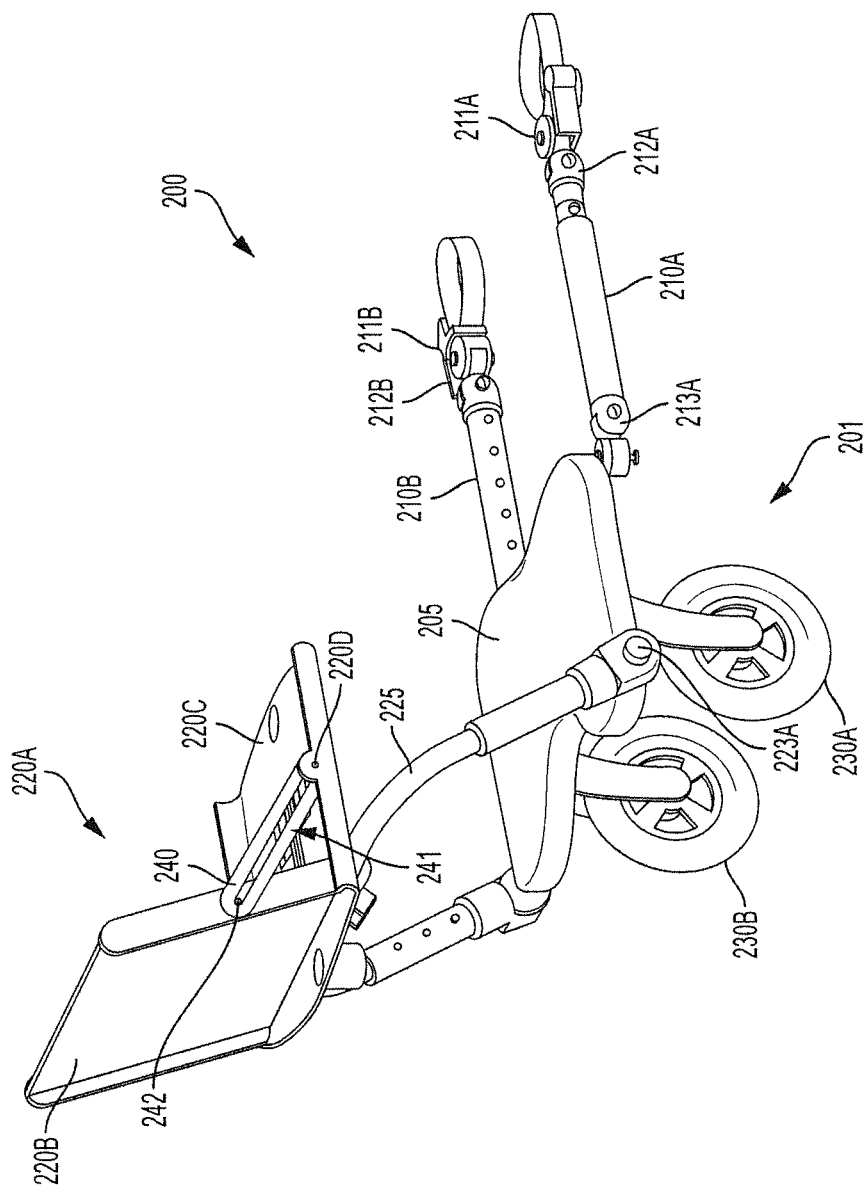
FIG. 6 shows an alternative exemplary riding board in a sitting configuration with a seat facing forward in a completely unfolded and upright position.

As shown in FIG. 6, riding board apparatus 200 comprises a seat 220A including a seat rest 220C and backrest 220B that is convertible between a forward and rearward facing position. The backrest 220B of seat 220A is mounted to the seat rest 220C by at least one pivoting arm 240 with a slot 241. The pivoting arm 240 is mounted to the seat rest 220C at hinge 220D near a center point of the seat rest 220C. The backrest 220B includes pins 242 extending laterally from a center point of the back rest 220B. The backrest 220B is mounted in a slot 241 of the pivoting arm 240 by pins 242 to provide a slideable and rotatable engagement between the backrest 220B and pivoting arm 240. As shown by direction arrow A in FIGS. 7 and 8, the backrest 220B is movable between a forward facing position depicted in FIG. 6 to a rear facing position depicted in FIG. 8. Preferably, the backrest 220B also includes a releasable locking mechanism configured to secure the backrest 220B in either the forward or rear facing positions. For example, the locking mechanism may be a tab 243 extending from the back rest 220B that engages and interlocks with a corresponding slot in the seat rest 220C.

In the exemplary riding board apparatus 200 of FIG. 6, the seat 220A is connected to the wheeled platform 201 via a pivoting, U-shaped chair support 225. Each of the two distal prongs of the U-shaped chair support 225 are mounted laterally to the rear wheeled platform 201 by pivot hinges 223A, 223B. Preferably, pivot hinges 223A, 223B allow the chair support 225 to rotate up to approximately 360 degrees relative to the board 205. Optionally, the chair support 225 may also be adjustable to allow the seat 220A to be positioned and set at a desired height or angle. Additionally, the chair support 225 and seat 220A may be permanently mounted on the board 205 or, alternatively, the entire chair support 225 and/or seat 220A may be configured to be completely detachable and removable as desired.

Figure 10:
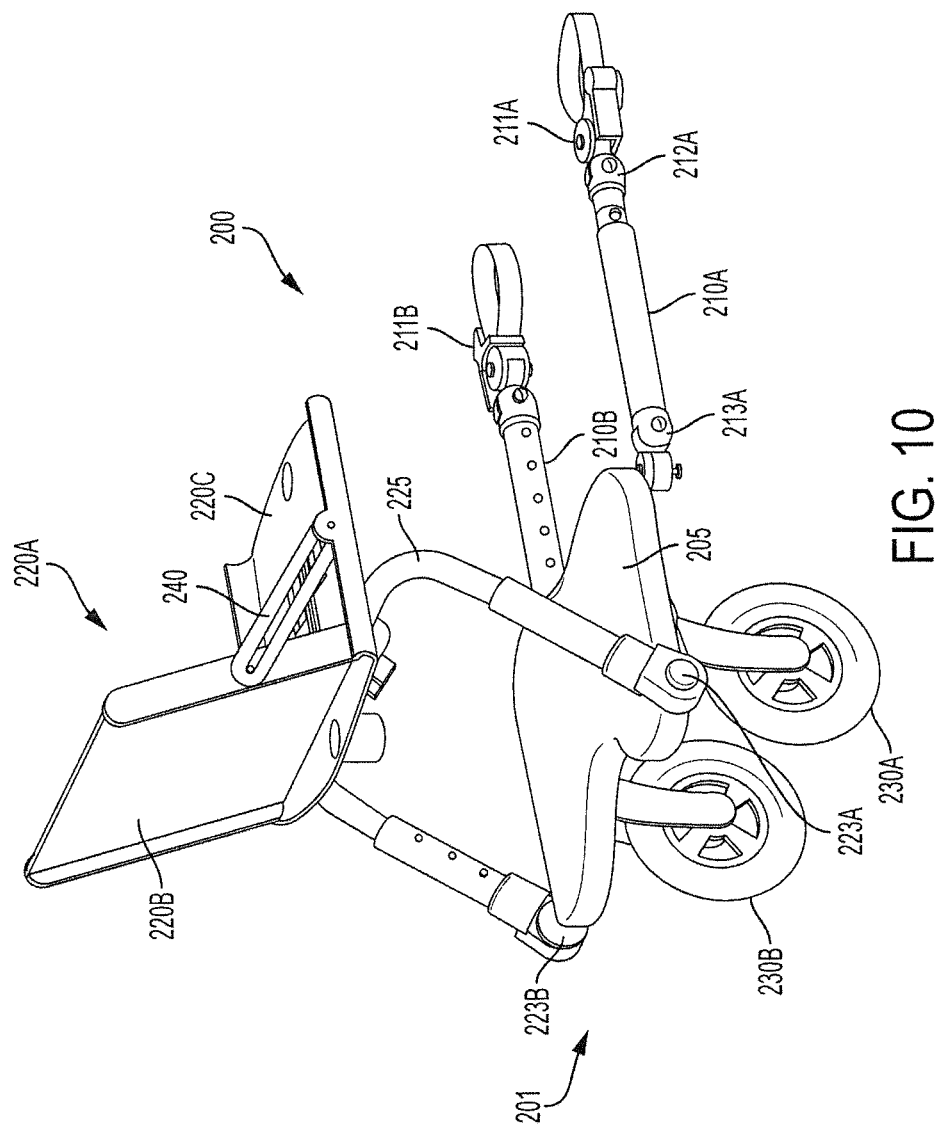
FIG. 10 shows the alternative exemplary riding board depicted in FIG. 6 in a sitting configuration with chair support and seat in a forward position.

As seen by comparison of FIG. 6 and FIG. 10, the chair support 225 can be configured to position seat 220A at a desired position. For example, pivoting of the chair support 225 moves the seat 220A anteriorly or posteriorly relative to the board 205. However, the chair support 225 may alternatively be configured to move laterally in a side-to-side motion. The pivot hinges 223A, 223B can be releasably lockable to stabilize and support the seat 220A when the chair support 225 is in the desired position. Optionally, the angle of the chair support 225 can be selected to position the seat 220A in a reclined or horizontal position.

Figure 11:
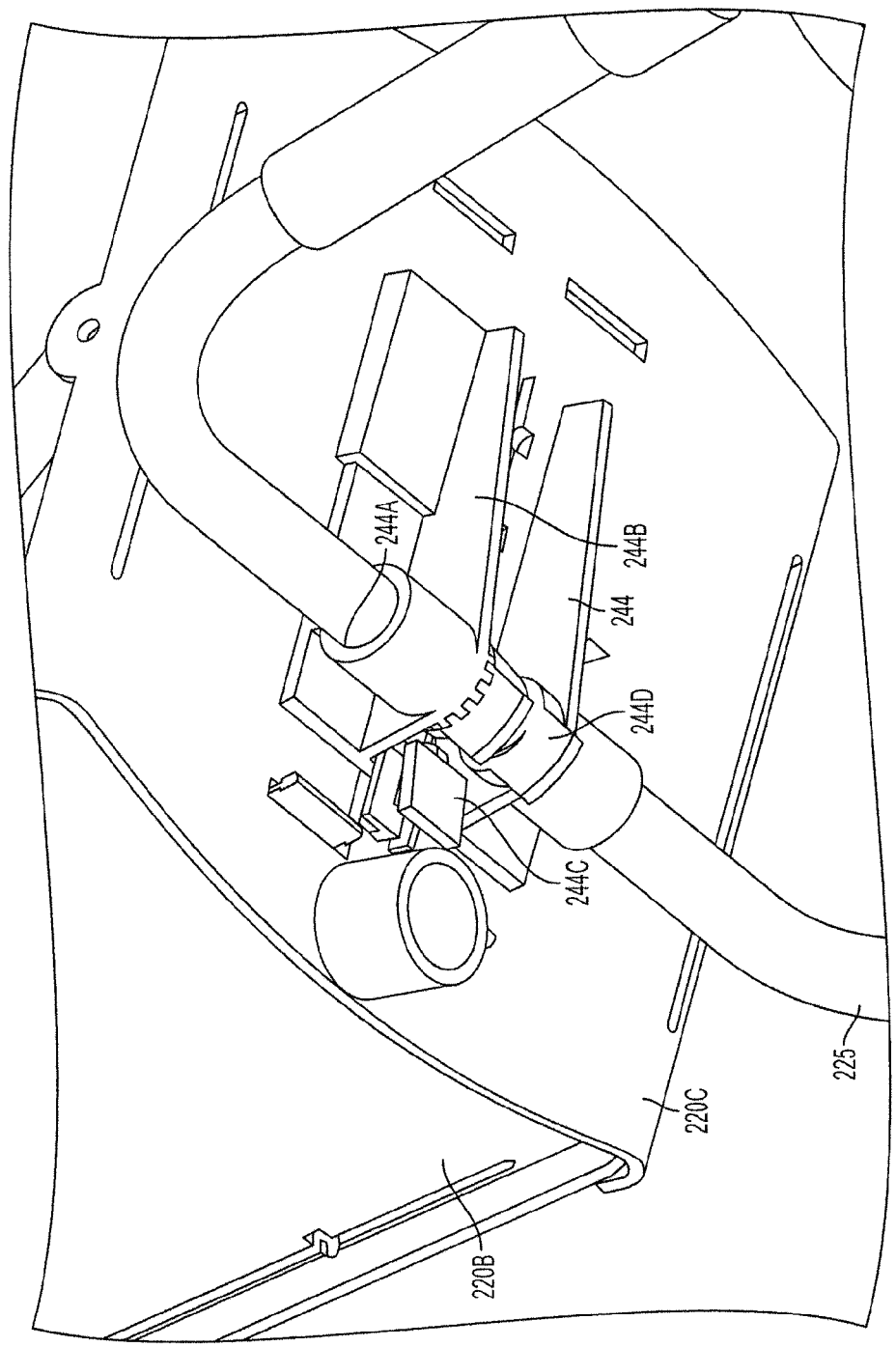
FIG. 11 shows an enlarged view of the underside of the seat of the alternative exemplary riding board depicted in FIG. 6.

The seat 220A is preferably mounted to the chair support 225 by a pivoting bracket 244. As best seen by comparison of FIGS. 9 and 10, pivoting bracket 244 allows the seat 220A to pivot relative to the chair support 225 up to 360°. Advantageously, the pivoting bracket 244 allows the seat 220A to pivot relative to the chair support 225 during moving of the seat 220A to the stowable configuration for compact folding. As best seen in FIG. 11, the pivoting bracket 244 may include a channel 244A configured to receive the chair support 225 passing therethrough. The pivoting bracket 244 is rotatable around the chair support 225 to allow adjustment of the angle of the seat 220A relative to the chair support 225. The pivoting bracket 244 may further include a releasable locking mechanism 244D to lock the angle of seat 220A relative to the chair support 225 at a desired position The pivoting bracket 244 may also include extending support member 244B configured to engage and support the seat rest 220C. Optionally, the pivoting bracket may further include a releasable slide lock 244C to adjust the position of seat 220A forwards and backwards relative to the chair support 225 as desired.

Preferably, the pivoting bracket 244 is releasably lockable to stabilize and support the seat 220A when in use by a child and to maintain the seat 220A in the stowable configuration. Optionally, the angle of the seat 220A can be selected and set in a reclined or horizontal position.

Figure 7:
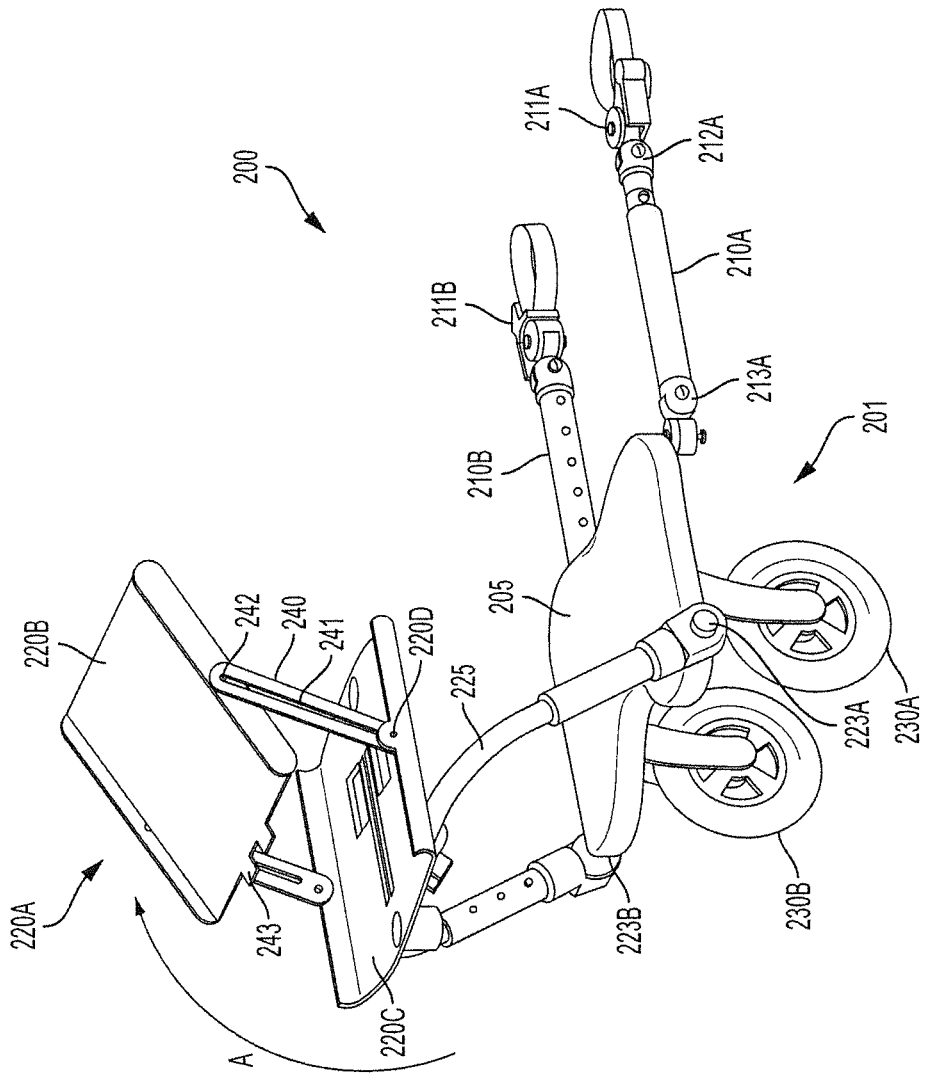
FIG. 7 shows the alternative exemplary riding board depicted in FIG. 6 with the seat being moved to a rear-facing position.
Figure 8:
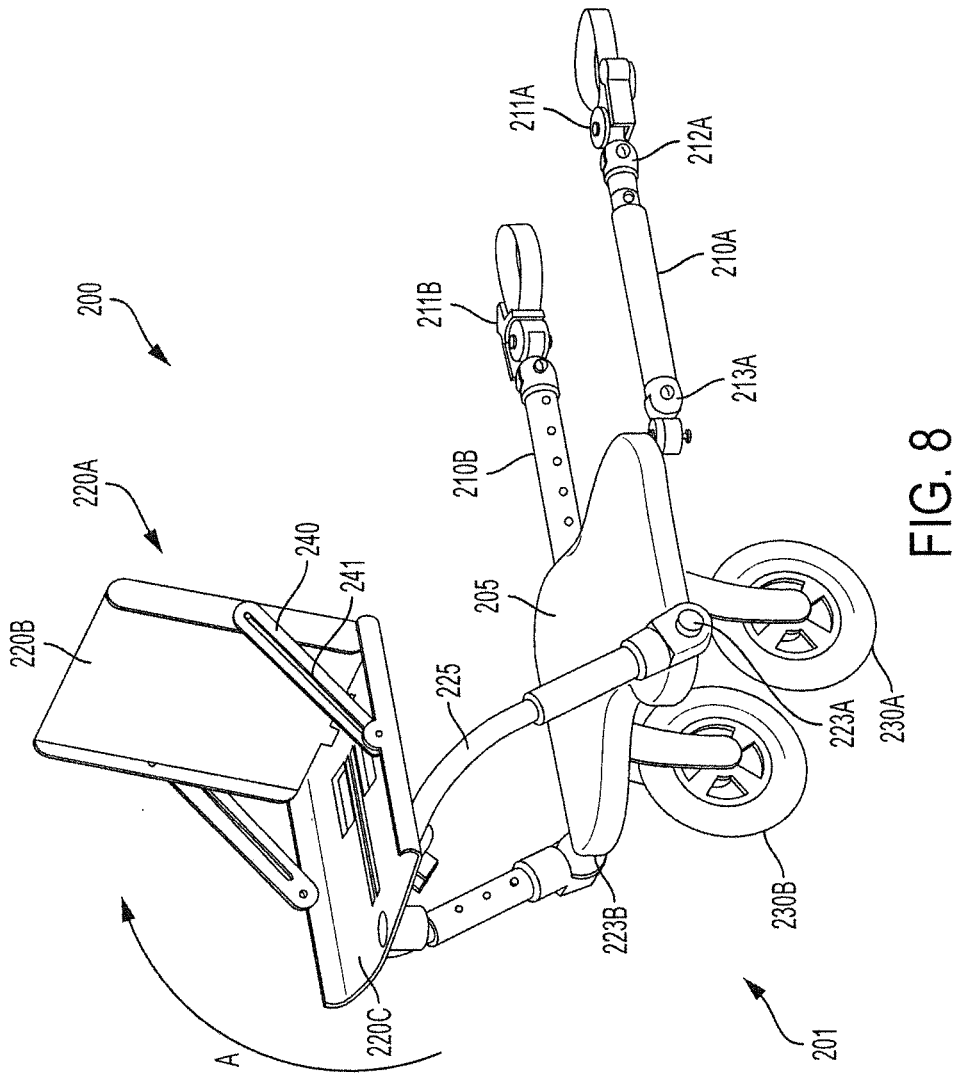
FIG. 8 shows the alternative exemplary riding board depicted in FIG. 6 in a sitting configuration with the seat in a rear-facing position.

A method for moving the seat 220A between forward and rear-facing directions will now be discussed with reference to FIGS. 6 to 8. In FIG. 6, the riding board apparatus 200 is shown with seat 220A in a sitting configuration and a forward-facing position. The chair support 225 is positioned extending at an angle behind the wheeled platform 201 and the seat 220A is positioned facing forward. FIGS. 7 and 8 show seat 220A during movement of the back rest 220B from a forward-facing position (as shown in FIG. 6) to a rear-facing position (as shown in FIG. 8). If included, the backrest locking mechanism, such as tab 243 can be disengaged to release the backrest 220B and allow the backrest 220B to be moved forward. Direction arrow A in FIG. 7 shows the forward (e.g., anterior) movement of the back rest 220B and pivoting arm 240. As shown in FIG. 6, the pin 242 of the backrest 220B freely rotate in the slot 241 to adjust the angle of the backrest 220B. The backrest 220B can be releasably locked in a rear-facing position (e.g., posterior-facing position) by engagement of at least one tab 243 with the a slot (shown in FIG. 11) on a forward side of the seat rest 220C. Likewise, the backrest 220B can be releasably locked in a forward-facing position (e.g., anterior-facing position) by engagement of the at least one tab 243 with the a slot (shown in FIG. 11) on a rear side of the seat rest 220C.

Figure 9:
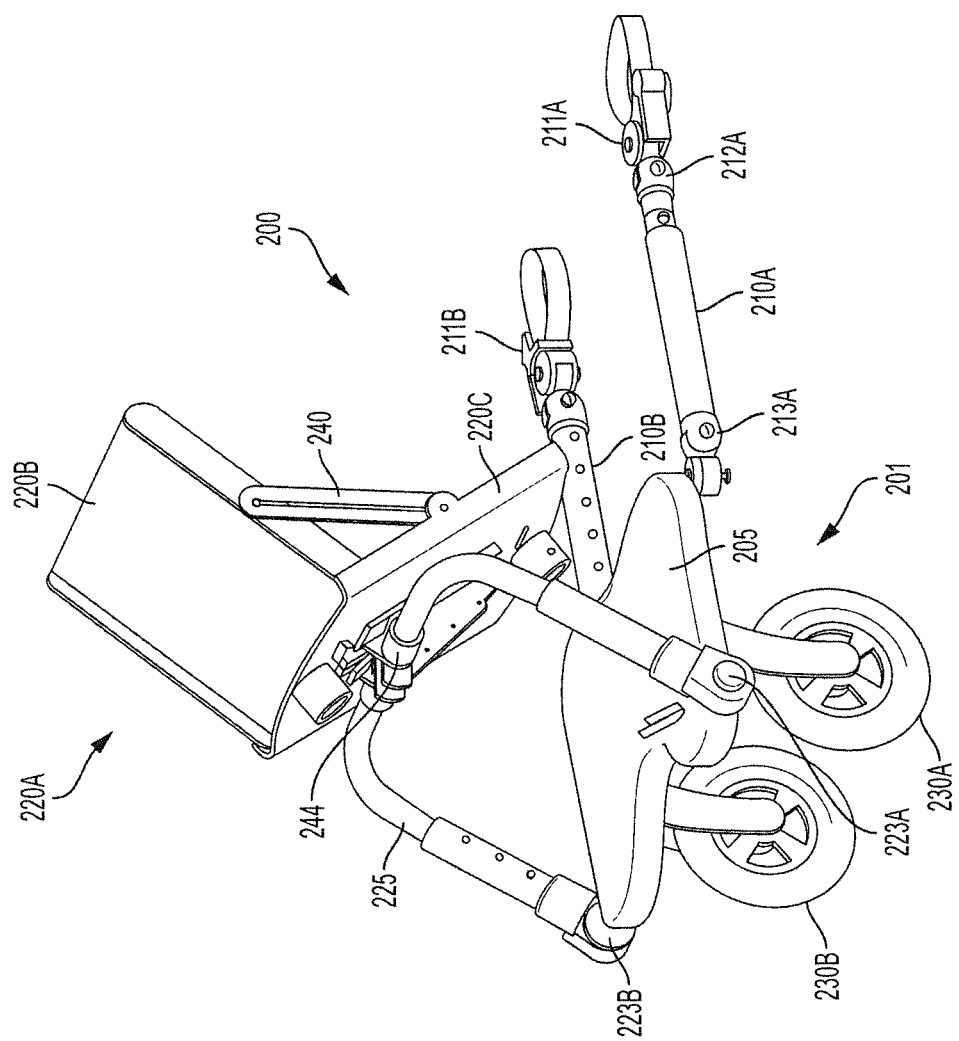
FIG. 9 shows the alternative exemplary riding board depicted in FIG. 6 in a sitting configuration with the chair support being moved forward.

A method for moving the chair support 225 between rear and forward positions will now be discussed with reference to FIGS. 6 and 9 to 10. In FIG. 6, the riding board apparatus 200 is shown with chair support 225 in a rear position extending at an angle toward the rear side of the wheeled platform 201. FIGS. 9 and 10 show the seat 220A during movement of the chair support 225 to a forward position extending at an angle toward the front side of the wheeled platform 201. As shown in FIG. 9, the chair support 225 is pivoted forward on pivot hinges 223A. Adjusting the angle of the chair support 225 relative to the board 205 causes the seat 220A to tilt forward. As shown in FIG. 10, the seat 220A can be levelled to a horizontal orientation by adjusting the angle of seat 220A relative to the chair support 225 via adjustment of the pivoting bracket 244. The pivoting bracket 244 is then able to be locked in position to stabilize seat 220A.

Figure 12:
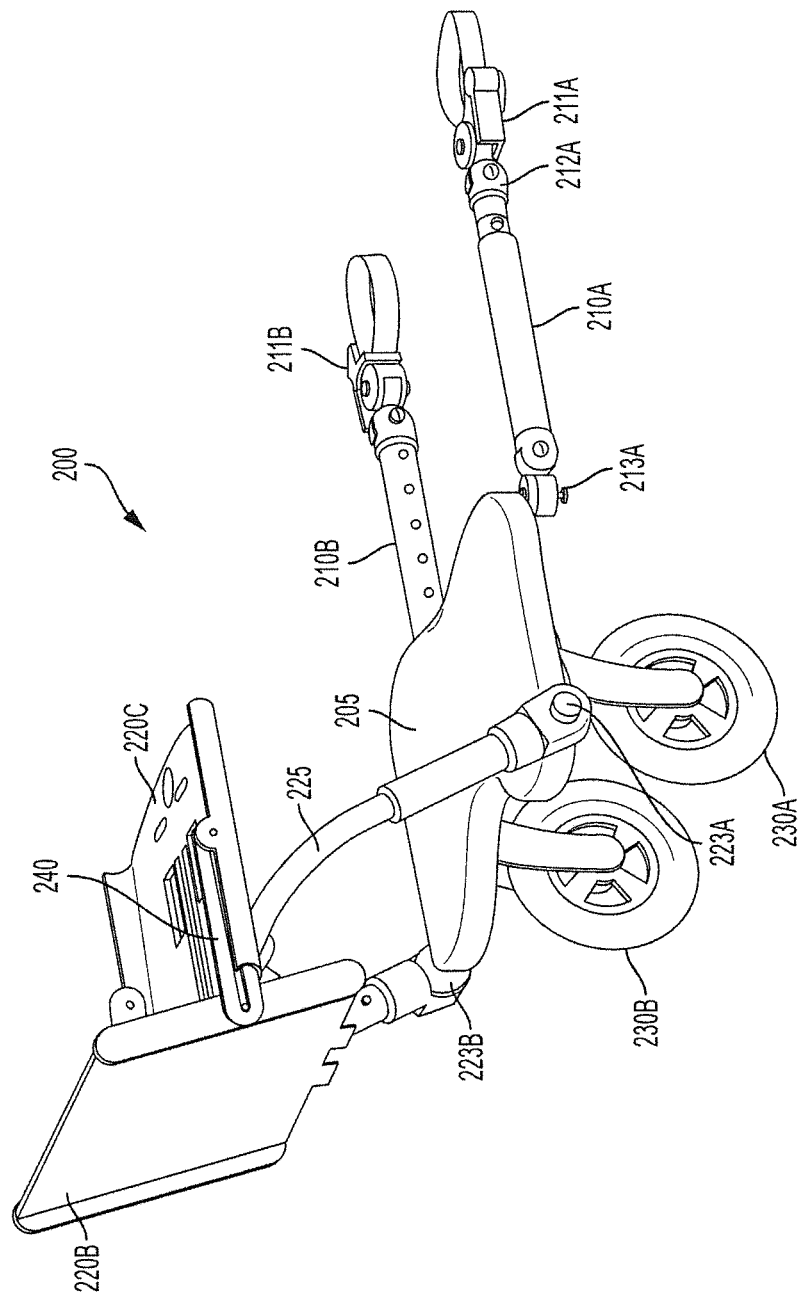
FIG. 12 shows the alternative exemplary riding board depicted in FIG. 6 with the backrest of the seat being moved to a folded position.
Figure 13:
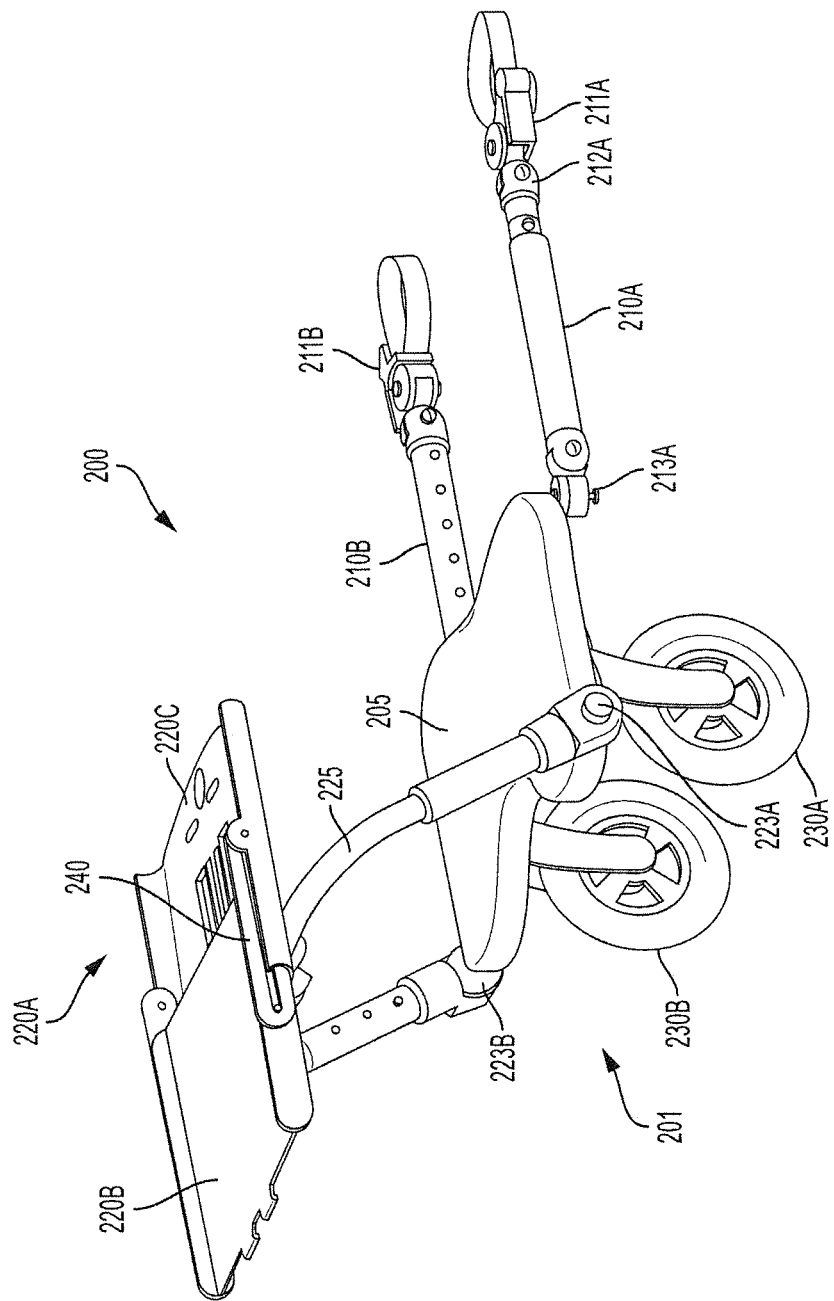
FIG. 13 shows the alternative exemplary riding board depicted in FIG. 6 with the backrest of the seat in a further step of being moved to a folded position.
Figure 14:
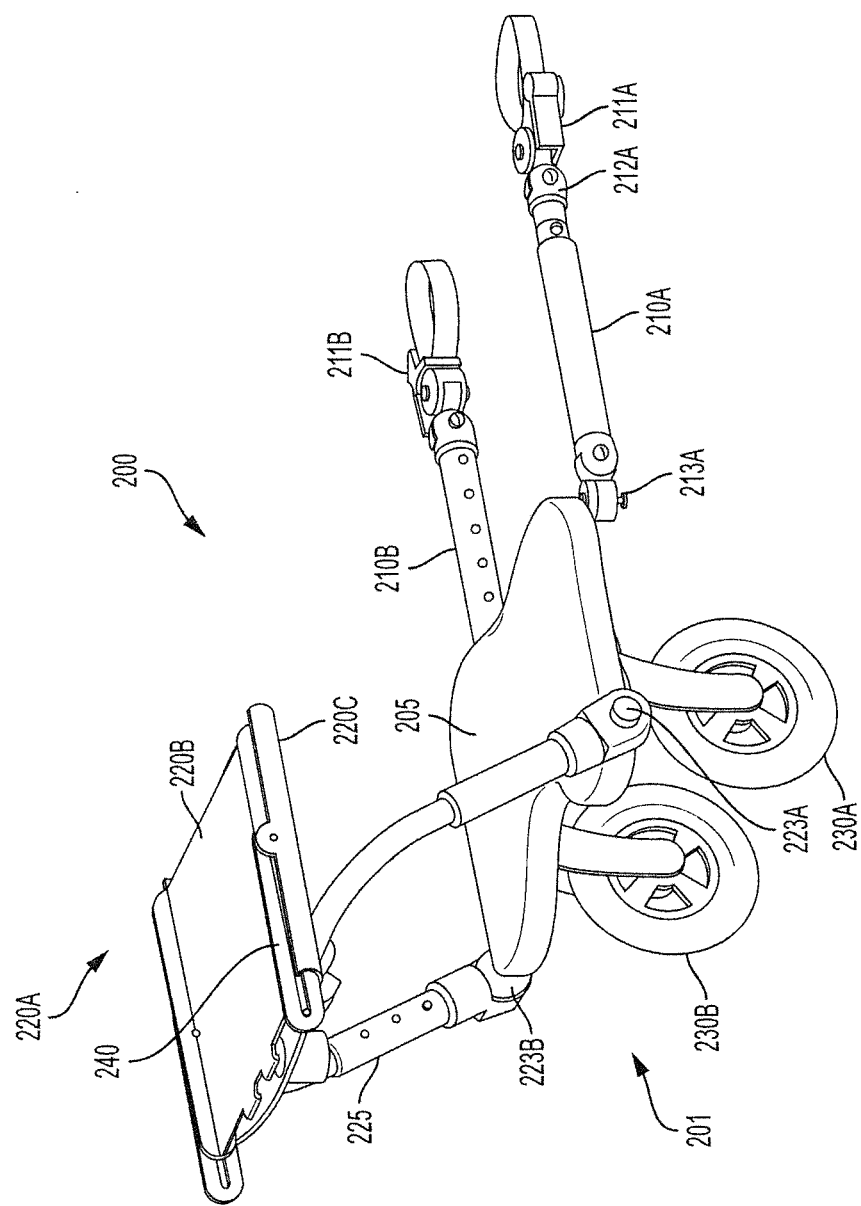
FIG. 14 shows the alternative exemplary riding board depicted in FIG. 6 with the backrest of the seat in a folded position.

A method for moving the riding board apparatus between the sitting configuration and stowable configuration will now be discussed with reference to FIGS. 6 and 12-18. In FIG. 6, the riding board apparatus 200 is shown with seat 220A in a sitting configuration. The initial step of moving the riding board apparatus between the sitting configuration and stowable configuration is folding the backrest 220B, if one is included. FIGS. 12 to 14 depict positioning the backrest 220B in a folded position. If included, the backrest locking mechanism, such as tab 243 can be disengaged to release the backrest 220B and allow the backrest 220B to be moved to the folding position. Then, as shown in FIG. 12, the pivoting arm 240 is positioned level with the seat rest 220C. FIG. 13 shows the backrest 220B positioned substantially level with the seat rest 220C by rotating the backrest 220B relative to the pivoting arm 240. The backrest 220B can be slid forward by movement of the pin 242 through the slot 241. As shown in FIG. 14, the backrest 220B is in the folded position substantially overlapping the seat rest 220C.

Figure 15:
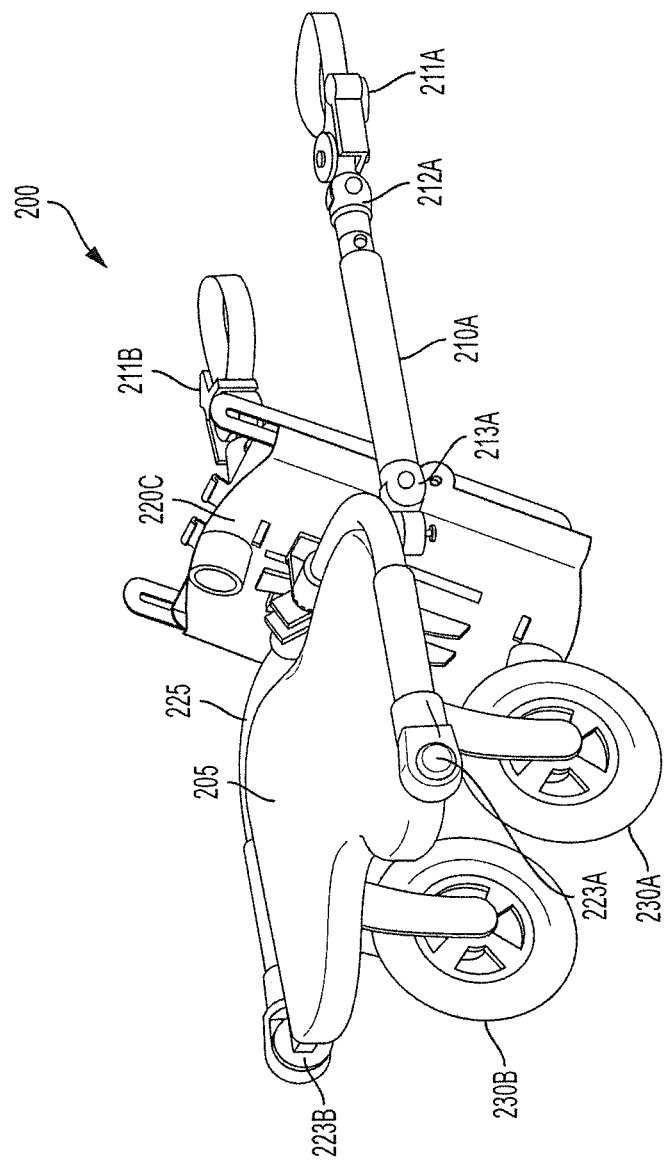
FIG. 15 shows the alternative exemplary riding board depicted in FIG. 6 with the seat being moved to a stowable configuration under the wheeled platform.
Figure 16:
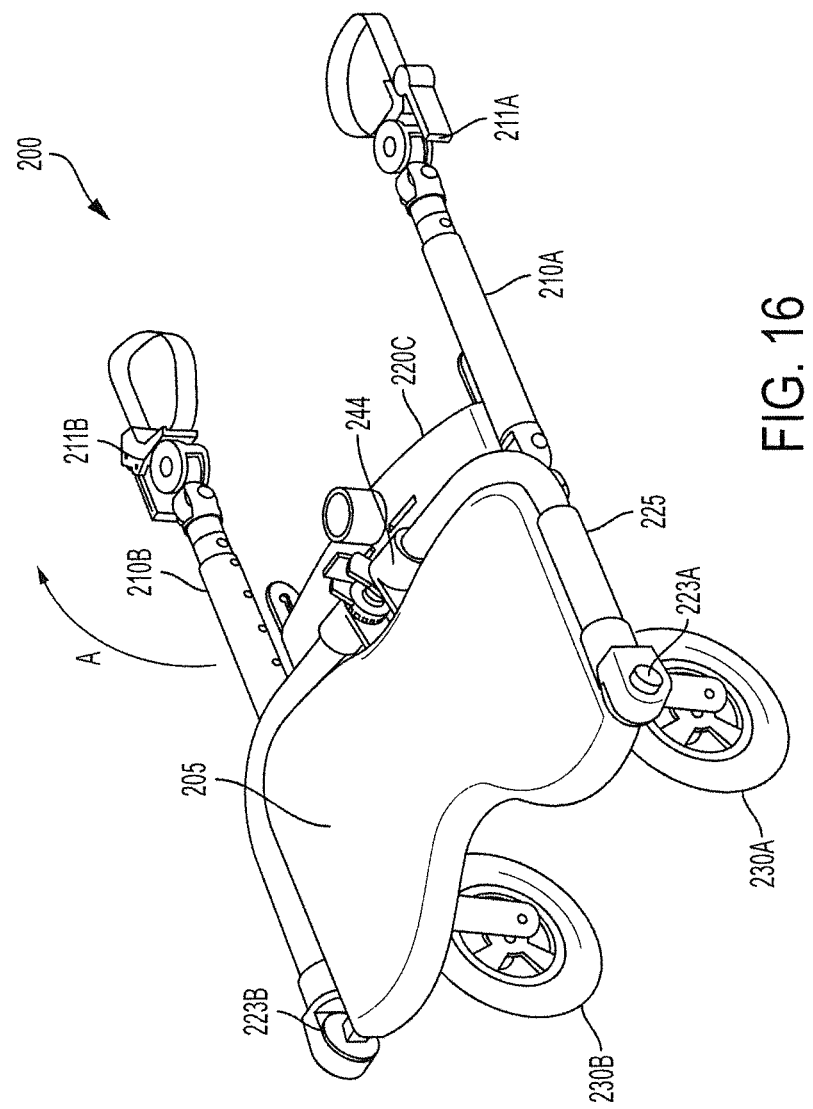
FIG. 16 shows the alternative exemplary riding board depicted in FIG. 6 in a stowable configuration under the wheeled platform.

With the backrest 220B folded, the seat 220A can be moved to the stowable configuration. FIGS. 15 and 16 show movement of the seat 220A to the stowable configuration. As shown in FIG. 15, the chair support 225 can be pivoted forward to a position that is substantially level with the board 205. Then, the seat 220A in the folded position may be rotated forward around the chair support 225 by operation of the pivoting bracket 244. As shown in FIG. 16, the seat 220A can be pivoted on the pivoting bracket 244 to a stowable configuration in which the seat 220A is substantially horizontal underneath the board 205. If necessary, the positioning of the seat 220A can be further adjusted by the slide lock 244C.

Figure 17:
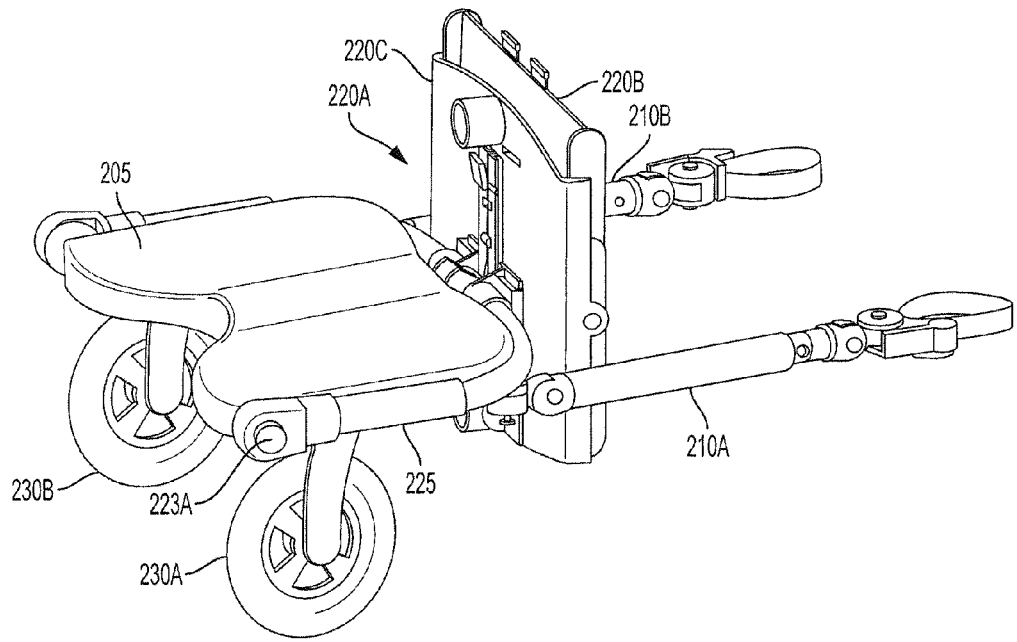
FIG. 17 shows the alternative exemplary riding board depicted in FIG. 6 in a stowable configuration on a side of the wheeled platform.
Figure 18:
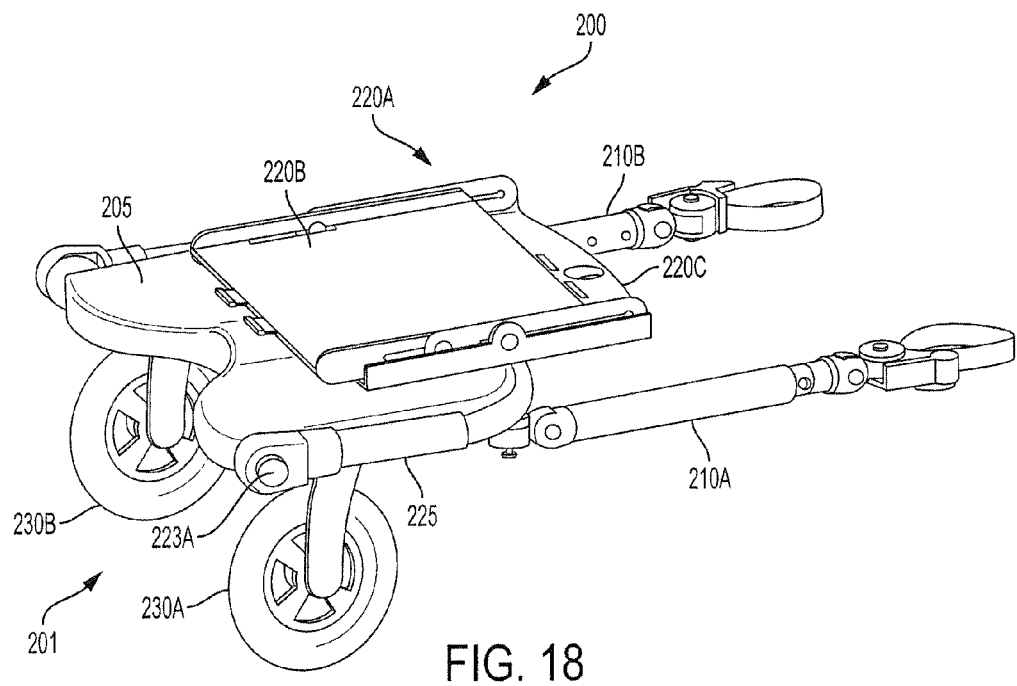
FIG. 18 shows the alternative exemplary riding board depicted in FIG. 6 in a stowable configuration with the seat folded and positioned to provide a horizontal surface of a standing platform.

However, other configurations of the stowable configuration where the seat 220A is not stowed underneath the wheeled platform 201 are possible. For example, as shown in FIG. 17, the seat 220A may be folded and stored on a side of the wheeled platform 201. Alternatively, as shown in FIG. 18, the seat 220A may be configured so that the backrest 220B forms a horizontal surface of a standing platform.

The riding board apparatus 200 may further be moved towards the back of the stroller to the lifted configuration so that the board is raised up and out of the way, if desired. It will be understood that the riding board apparatus 200 may be converted between the lifting configuration, stowable configuration and sitting configuration by altering the ordering of the steps.

Optionally, the riding board apparatus may comprise any one or a combination of additional features. For example, the seat may be fitted with a removable handlebar and/or a removable footrest. In some examples, the handlebar or footrest may be in the form of a T-bar that may be optionally used interchangeably as either a handlebar or footrest depending on how the T-bar is mounted on the seat. FIG. 1 shows an exemplary seat 120A with a handlebar 114 and a removable footrest 115. The seat may optionally also be provided with a seatbelt. Optionally, the riding board apparatus may include a canopy for protection from the sun, a plastic rain cover, an umbrella holder, a snack tray with cup/bottle holder, winter bunting, seat cover, additional padding, and/or a stroller handlebar extender for more comfort when pushing the stroller. Other attachments may also be utilized. Optionally, the riding board apparatus may further include interlocking fittings, grooves or clamps for mounting and stowing any one or more of these additional features on the riding board apparatus.

Optionally, the riding board apparatus may also be equipped with a strap or handle (not shown) for lifting the riding board apparatus in the lifted configuration. Additionally, the riding board apparatus may include a securement mechanism configured to secure and maintain the riding board apparatus in the lifted configuration.

The invention claimed is:

1. A riding board apparatus configured to be mounted to a stroller, the riding board apparatus comprising:
    a wheeled platform,
    at least one mounting arm extending from the platform,
    a chair support moveably mounted to the wheeled platform, and
    a seat comprising a seat rest and a backrest mounted onto the chair support,
    wherein the riding board apparatus is configured to be convertible between a sitting configuration and a stowable configuration.

2. The riding board apparatus of claim 1, wherein the seat is positioned underneath the wheeled platform in the stowable configuration.

3. The riding board apparatus of claim 1, wherein the seat is positioned on a side of the wheeled platform in the stowable configuration.

4. The riding board apparatus of claim 1, wherein the seat is positioned above the wheeled platform in the stowable configuration whereby a portion of the seat forms a horizontal surface of a standing platform.

5. The riding board apparatus of claim 1, wherein the backrest is foldable.

6. The riding board apparatus of claim 5, wherein the backrest is moveable between a forward-facing position and a rear-facing position.

7. The riding board apparatus of claim 1, wherein the chair support is axially rotatable.

8. The riding board apparatus of claim 1, wherein the seat is pivotably mounted to the chair support.

9. The riding board apparatus of claim 1, wherein the at least one mounting arm comprises at least one pivoting joint.

10. The riding board apparatus of claim 1, wherein a distal end of the at least one mounting arm comprises a mounting device for mounting the riding board apparatus to a stroller.

11. The riding board apparatus of claim 1, wherein a vertical height of the chair support is adjustable.

12. The riding board apparatus of claim 1, wherein the seat is mounted to the platform by a pivotable U-shaped chair support.

13. The riding board apparatus of claim 1, wherein the seat is mounted to the platform by a pivotable L-shaped chair support.

14. The riding board apparatus of claim 1 further configured to be moveable from the stowable position to a lifted position by lifting a rear side of the riding board apparatus.

15. The riding board apparatus of claim 14, wherein the riding board apparatus is securable to the stroller in the lifted position.

16. The riding board apparatus of claim 1, wherein the seat is removeably mounted to chair support.

17. The riding board apparatus of claim 1, wherein the chair support is removeably mounted to the wheeled platform.

18. The riding board apparatus of claim 1, wherein the riding board apparatus is configured to be convertible between a sitting configuration and a stowable configuration by:
    pivoting the chair support relative to the wheel platform, and
    rotating the seat relative to the chair support.

* * * * *